United States Patent
Michaelis et al.

(10) Patent No.: US 12,361,963 B2
(45) Date of Patent: Jul. 15, 2025

(54) DETECTION OF AUDIO ISSUES ON A COMMUNICATION SESSION FROM VIDEO ANALYSIS

(71) Applicant: Avaya Management L.P., Durham, NC (US)

(72) Inventors: Paul Roller Michaelis, Louisville, CO (US); Valentine C. Matula, Granville, OH (US); Dean David Beightol, Superior, CO (US)

(73) Assignee: Avaya Management L.P., Morristown, NJ (US)

( * ) Notice: Subject to any disclaimer, the term of this patent is extended or adjusted under 35 U.S.C. 154(b) by 143 days.

(21) Appl. No.: 17/217,135

(22) Filed: Mar. 30, 2021

(65) Prior Publication Data

US 2022/0319537 A1 Oct. 6, 2022

(51) Int. Cl.
*G10L 25/78* (2013.01)
*G10L 15/22* (2006.01)

(52) U.S. Cl.
CPC .............. *G10L 25/78* (2013.01); *G10L 15/22* (2013.01); *G10L 2015/225* (2013.01); *G10L 2015/227* (2013.01)

(58) Field of Classification Search
CPC ... G10L 15/00; G10L 15/22; G10L 2015/225; G10L 2015/227; G10L 25/00; G10L 25/78
See application file for complete search history.

(56) References Cited

U.S. PATENT DOCUMENTS

| | | | |
|---|---|---|---|
| 7,720,217 B1 | 5/2010 | Connolly | |
| 7,848,511 B2 | 12/2010 | Dresher et al. | |
| 9,560,316 B1* | 1/2017 | Lindberg | H04N 7/15 |
| 2007/0291667 A1* | 12/2007 | Huber | H04L 65/756 |
| | | | 370/260 |
| 2008/0152309 A1* | 6/2008 | Shih | H04N 9/89 |
| | | | 386/E9.06 |
| 2010/0081487 A1* | 4/2010 | Chen | H04M 9/082 |
| | | | 455/575.1 |
| 2013/0120522 A1* | 5/2013 | Lian | H04N 7/15 |
| | | | 348/E7.083 |
| 2014/0289630 A1* | 9/2014 | Duwenhorst | G11B 27/28 |
| | | | 715/727 |
| 2015/0249736 A1* | 9/2015 | Johnston | H04M 1/6058 |
| | | | 455/418 |

(Continued)

FOREIGN PATENT DOCUMENTS

EP 2814244 A1 * 12/2014 ............... H04N 7/15

*Primary Examiner* — Daniel C Washburn
*Assistant Examiner* — Sean E Serraguard

(57) ABSTRACT

The technology disclosed herein enables detection of audio issues for a participant on a communication session from analysis of video of the participant. In a particular embodiment, a method includes receiving video of a first participant communicating over a communication session between a first endpoint of the participant and a second endpoint of a second participant. The method further includes determining from the video that the participant is speaking. In response to determining that the participant is speaking, the method includes determining an audio issue exists due to audio of the first participant not corresponding to the video and notifying the first participant about the audio issue.

20 Claims, 8 Drawing Sheets

(56) References Cited

U.S. PATENT DOCUMENTS

| | | | | |
|---|---|---|---|---|
| 2015/0280970 | A1* | 10/2015 | Heda | H04L 12/1822 714/4.11 |
| 2018/0358034 | A1* | 12/2018 | Chakra | G10L 25/78 |
| 2021/0037211 | A1* | 2/2021 | Godier | H04N 7/152 |
| 2021/0058436 | A1* | 2/2021 | Mombourquette | H04L 65/4015 |

* cited by examiner

DETECTION OF AUDIO ISSUES ON A COMMUNICATION SESSION FROM VIDEO ANALYSIS

TECHNICAL BACKGROUND

A relatively common occurrence on communication sessions, such as conference calls, over which multiple participants are communicating in real-time, is that a participant is unaware that they are not being heard by other participants. For instance, the participant may have forgotten to disable a local mute setting on their endpoint, may be having microphone problems, or may have a bad connection to the communication session. Unless another participant informs the speaking participant that they are not being heard (if the other participant even recognizes that the speaking participant is trying to speak), the speaking participant may fruitlessly continue speaking. Moreover, even if the other participant informs the speaking participant about their audio issue, the speaking participant may have difficulty pinpointing the cause of the audio issue (e.g., on mute, bad connection, etc.).

SUMMARY

The technology disclosed herein enables detection of audio issues for a participant on a communication session from analysis of video of the participant. In a particular embodiment, a method includes receiving video of a first participant communicating over a communication session between a first endpoint of the participant and a second endpoint of a second participant. The method further includes determining from the video that the participant is speaking. In response to determining that the participant is speaking, the method includes determining an audio issue exists due to audio of the first participant not corresponding to the video and notifying the first participant about the audio issue.

In some embodiments, notifying the first participant includes displaying a visual alert indicating the audio issue on a display of the first endpoint and/or playing an audible alert indicating the audio issue through a speaker of the first endpoint.

In some embodiments, determining the audio issue exists includes determining that a setting of the communication session with respect to the audio is causing the audio and the video to not correspond, determining that a hardware issue is causing the audio issue, determining that the audio is not synchronized in time with the video, and/or determining that the audio is below a threshold audio quality or is not being received.

In some embodiments, in response to determining the audio issue, the method includes determining that a secondary microphone of the first endpoint is capturing secondary audio of the first participant and, in response to determining that the secondary microphone is capturing the secondary audio, transferring the secondary audio over the communication session.

In some embodiments, the method includes notifying the second participant about the audio issue.

In some embodiments, receiving the video includes capturing the video from a camera of the first endpoint or receiving the video over a network connection with the first endpoint.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to receive video of a first participant communicating over a communication session between a first endpoint of the participant and a second endpoint of a second participant. The program instructions further direct the processing system to determine from the video that the participant is speaking. In response to determining that the participant is speaking, the program instructions direct the processing system to determine an audio issue exists due to audio of the first participant not corresponding to the video and notify the first participant about the audio issue.

DETAILED DESCRIPTION

The examples provided herein enable detection of audio issues for a participant on a communication session based on video captured of the participant. In particular, video is captured of the participant and the video is analyzed to determine whether the participant is speaking. If the participant is speaking according to the video analysis but audio captured of the participant does not correspond to the video, then the participant is notified that an audio issue is present. For example, the audio may not exist at all (e.g., a microphone signal may not be received), the audio may be out of sync with the video, the audio may be of low quality, or some other type of issue may exist that adversely effects the audio's ability to be heard on the communication session. Notifying the participant about the audio issue allows the participant to troubleshoot a fix for the audio issue, if possible, and saves other participants on the call from having to notify the participant of the issue, if any of the other participants even recognize or care that an issue is occurring.

Figure 1:
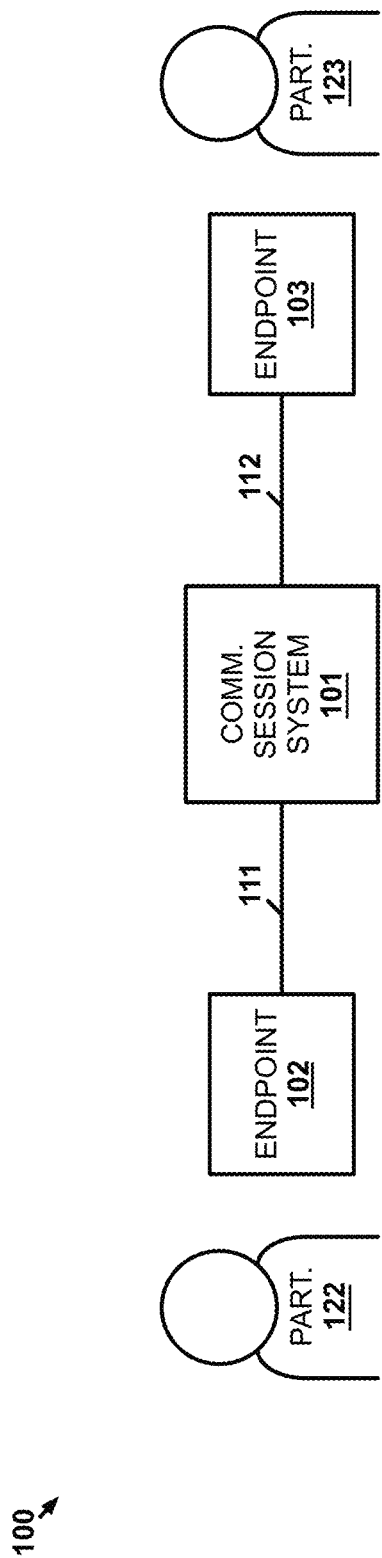
FIG. 1 illustrates an implementation for using video analysis to detect audio issues on a communication session.

FIG. 1 illustrates an implementation 100 for using video analysis to detect audio issues on a communication session. Implementation 100 includes communication session system 101, endpoint 102, and endpoint 103. Participant 122 is a user that operates endpoint 102 and participant 123 is a user that operates endpoint 103. Endpoint 102 and communication session system 101 communicate over communication link 111. Endpoint 103 and communication session system 101 communicate over communication link 112. Communication links 111-112 are shown as direct links but may include intervening systems, networks, and/or devices.

In operation, endpoint 102 and endpoint 103 may each respectively be a telephone, tablet computer, laptop computer, desktop computer, conference room system, or some other type of computing system capable of connecting to a communication session facilitated by communication session system 101. Communication session system 101 facilitates real-time communication sessions between two or more endpoints, such as endpoint 102 and endpoint 103. In some examples, communication session system 101 may be omitted in favor of a peer-to-peer communication session between endpoint 102 and endpoint 103. A communication session may be audio only (e.g., a voice call) or may also include at least a video component (e.g., a video call). During a communication session, participant 122 and participant 123 are able to speak with, or to, one another by way of their respective endpoints 102 and 103 capturing their voices and transferring the voices in audio signals over the communication session. In some situations, there may be issues with the audio captured of participant 122 and participant 123. Operation 200 is performed to detect an audio issue and notify one or more of participant 122 and participant 123 about the issue.

Figure 2:
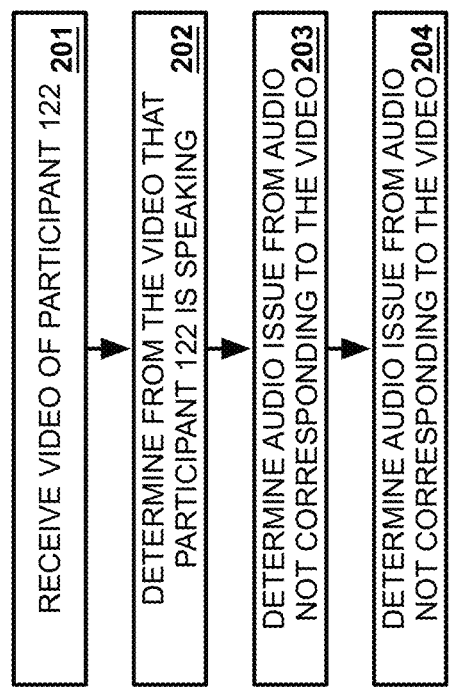
FIG. 2 illustrates an operation to use video analysis to detect audio issues on a communication session.

FIG. 2 illustrates operation 200 to use video analysis to detect audio issues on a communication session. Operation 200 may be performed by any one of systems 101-103 and, in some cases, portions of operation 200 may be distributed among two or more of systems 101-103. Operation 200 includes receiving video of participant 122 who is communicating over a communication session between endpoint 102 and endpoint 103 (201). While the communication session is only described to be between two endpoints, it should be understood that any number of two or more endpoints may be on the communication session. If the video is received by endpoint 102, then receiving the video may include capturing the video using a camera of endpoint 102 (e.g., a camera built into endpoint 102 or otherwise connected to endpoint 102 as a peripheral). If communication session system 101 or endpoint 103 is receiving the video, then receiving the video may include receiving a signal including the video over communication link 111 and/or communication link 112. In those examples, the video may be included in the user communications transmitted on the communication session (e.g., when the communication session is a video call) or may be sent out as an out of band signal associated with the communication session when the communication session does not include video of the participants (e.g., when the communication session is a voice call). The video may be encoded in any video format supported by systems 101-103.

Upon receiving the video, operation 200 includes determining from the video that participant 122 is speaking (202). Facial recognition algorithms may be used to identify the face of participant 122 within the video image and, more specifically, may identify where on the face the mouth is located. Participant 122 may be determined to be speaking if the mouth is simply moving (e.g., lips of the mouth opening and closing) or is moving in a manner consistent with a person speaking. For instance, a machine learning algorithm may be trained to recognize speech movements rather than other types of mouth movements, such as fidgety mouth movements, where a participant is not actually speaking. In further examples, the algorithm may be trained to recognize the actual sounds (possibly even whole words) that would be made from certain mouth movements, which may then be used in the next step to determine whether a particular audio issue is occurring. In some examples, aspects of participant 122 other than mouth movement may be identified from the video. For instance, participant 122 may be moving their body or gesturing (e.g., hand movements, head movements, etc.) in a manner that is consistent with a person speaking.

In response to determining that the participant is speaking, operation 200 includes determining that an audio issue exists due to audio of participant 122 not corresponding to the video (203). The audio issue may be no audio being received of participant 122 (e.g., no audio captured by endpoint 102 and/or received over communication links 111/112), audio being received that does not include speech, audio being received but the included speech is of low quality so as to make it difficult to comprehend by participant 123 when played at endpoint 103 (e.g., speech volume is too low, audio includes static, portions of the audio are cutting out, etc.), audio being received but the speech therein is not in sync with the video (e.g., speech sounds determined through the above video analysis do not match in time to the sounds included in the audio), or some other type of audio issue that would detract from participant 123's ability to hear/comprehend speech from participant 122 over the communication session. The system performing operation 200 may be configured to only monitor for a certain type of audio issue (e.g., only one of the above audio issue examples) or may be configured to monitor for two or more types of audio issues (e.g., two or more of the above audio issue examples). In some examples, the audio issue may be determined based solely on the audio itself (or lack of audio) after speech is detected in the video (e.g., by determining whether speech is included in the audio or determining a quality of the audio) or may be determined based on the audio relative to other input information, such as the video (e.g., to determine if the audio is in sync with the video), audio received from another source (e.g., determine whether a microphone built into endpoint 102 captured speech while a microphone peripheral that was designated to capture the speech did not), setting information for the communication session (e.g., whether endpoint 102 has a local mute enabled or a moderator remotely has participant 122 on mute), or from some other source of information relevant to potential audio issues.

After determining the existence of the audio issue, operation 200 includes notifying the participant 122 about the audio issue (204). If endpoint 102 itself identified the audio issue, then endpoint 102 may display a visual alert (e.g., displaying a popup graphic/window on a graphical display, illuminating a notification lamp, or some other manner of visually providing information to a user) that informs participant 122 about the audio issue, may play an audible alert (e.g., a voice message, tone, pattern of tones, jingle, etc.) that inform the user about the audio issue, may produce a tactile alert (e.g., vibration or vibration pattern), provide some other type of indication to participant 122 that informs participant 122 about the audio issue—including combinations thereof. If communication session system 101 or endpoint 103 determined the existence of the audio issue, then, to notify participant 122, the systems 101 or 103 may transmit a message, or other type of signal, to endpoint 102 that directs endpoint 102 to present an indicator or alert, like those described above, to inform participant 122 about the audio issue. In some examples, participant 122 may be notified with information about the type of audio issue identified. For example, endpoint 102 may display an alert that includes text reciting the type of audio issue (e.g., "Warning: audio out of sync with video" or "Alert: endpoint on mute"). The more information participant 122 is presented with, the better participant 122 can determine how to remedy the audio issue. In some examples, participant 123 may also be notified in a similar manner to inform participant 123 that an issue with audio from participant 122 has been detected (e.g., so that participant 123 does not need to notify participant 122 themselves about the issue or to indicate to participant 123 that the audio issue is not caused by endpoint 103).

With operation 200 occurring in substantially real-time during the communication session, participant 122 is quickly notified of any audio issue when that audio arises. If speech is detected in the ongoing video and the audio without issue, then the communication session simply proceeds as normal for participant 122. Once an audio issue is detected, then participant 122 is promptly notified so that remedial action, if any, can be taken. For example, upon notifying participant 122 about a low speech quality audio issue, participant 122 may switch microphones in hopes that a bad microphone was a cause of the issue.

Figure 3:
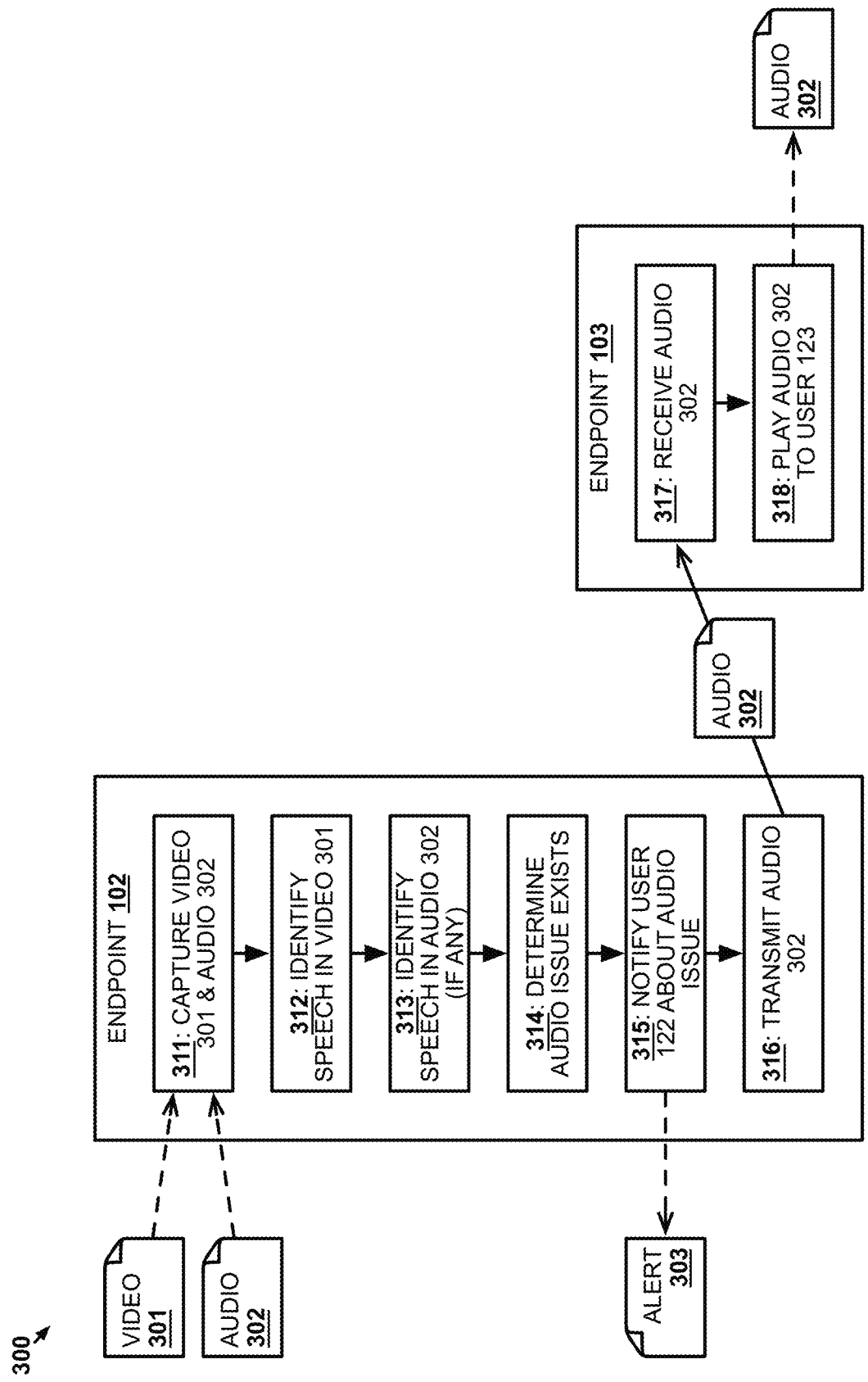
FIG. 3 illustrates an operational scenario for using video analysis to detect audio issues on a communication session.

FIG. 3 illustrates operational scenario 300 for using video analysis to detect audio issues on a communication session. Operational scenario 300 is an example of endpoint 102 performing operation 200 during a voice communication session with endpoint 103. Although, some or all of the steps performed by endpoint 102 may alternatively be performed in systems 101 or 103. In some examples, a software client for participating in communication sessions facilitated by communication session system 101 may execute on endpoint 102 to instruct endpoint 102 to perform operation 200. Endpoint 102 captures video 301 and audio 302 of participant 122 at step 311. Video 301 may be captured by a camera of endpoint 102 and audio 302 may be captured by a microphone of endpoint 102. Endpoint 102 identifies speech of participant 122 from within video 301 at step 312 even though video 301 is not sent over the communication session. Upon determining that speech is occurring in video 301, endpoint 102 also identifies whether speech is included in audio 302 at step 313. In some cases, endpoint 102 may determine that no audio was actually received and, if no audio was received, then audio 302 (which would be non-existent) inherently cannot include speech. Endpoint 102 may identify the speech by using a speech to text algorithm and/or a natural language processing algorithm to extract words from audio 302, if words are present in audio 302. In some cases, endpoint 102 may distinguish between words spoken by participant 122 or words spoken by another person at endpoint 102 (e.g., someone talking in the background).

The speech identified in step 313 is used to determine that an audio issue exists in audio 302 at step 314. If no speech was identified in audio 302 at step 313, then no further analysis of audio 302 may need to be performed at step 314 because endpoint 102 may simply indicate that the lack of speech is the audio issue. Although, in some examples, endpoint 102 may determine a reason for the lack of speech in audio 302. For instance, endpoint 102 may determine whether a software setting of the communication session (e.g., local mute) causes speech to be absent from audio 302 (or causing audio 302 to be missing altogether) or whether a hardware issue is causing the speech to be absent from audio 302 (or causing audio 302 to be missing altogether). In some examples, if no software configuration related cause is found, endpoint 102 may automatically determine that a hardware issue exists or endpoint 102 may attempt to troubleshoot the hardware (e.g., by activating another available microphone or performing a test procedure on the current microphone). If endpoint 102 did identify speech in audio 302 at step 313, then endpoint 102 may further process the speech to determine whether an audio issue exists (e.g., may determine whether there is an audio quality issue with the speech, or with audio 302 as a whole, or whether audio 302, and the speech therein, is in sync in time with video 301). For example, endpoint 102 may determine an audio issue exists when the speech to background noise ratio is below a threshold or may determine using natural language processing that words are being dropped from the speech.

Once an audio issue is determined to exist, endpoint 102 notifies participant 122 about the audio issue at step 315 using alert 303. Alert 303 may be a visual, audible, tactile, or some other type of alert that can be produced by a computing system like endpoint 102. Alert 303 may generically indicate that an audio issue exists or may provide additional information related to the audio issue, such as the type of audio issue, a cause of the audio issue, a recommended remedy for the audio issue, or some other type of relevant information.

Even though an audio issue was identified in this example, endpoint 102 still sends audio 302 over the communication session at step 316, so that endpoint 103 can receive audio 302 at step 317 and play audio 302 to participant 123 at step 318. In other examples, if audio 302 is never captured or the audio issue is determined to be severe enough (e.g., below a threshold quality), then endpoint 102 may determine not to send audio 302. Similarly, in some examples, endpoint 102 may transfer an instructions to endpoint 103 directing endpoint 103 to present an alert similar to alert 303 that notifies participant 123 about the audio issue that occurring with respect to audio 302 (e.g., may present a message reciting "Audio of participant 122 currently has issues).

Figure 4:
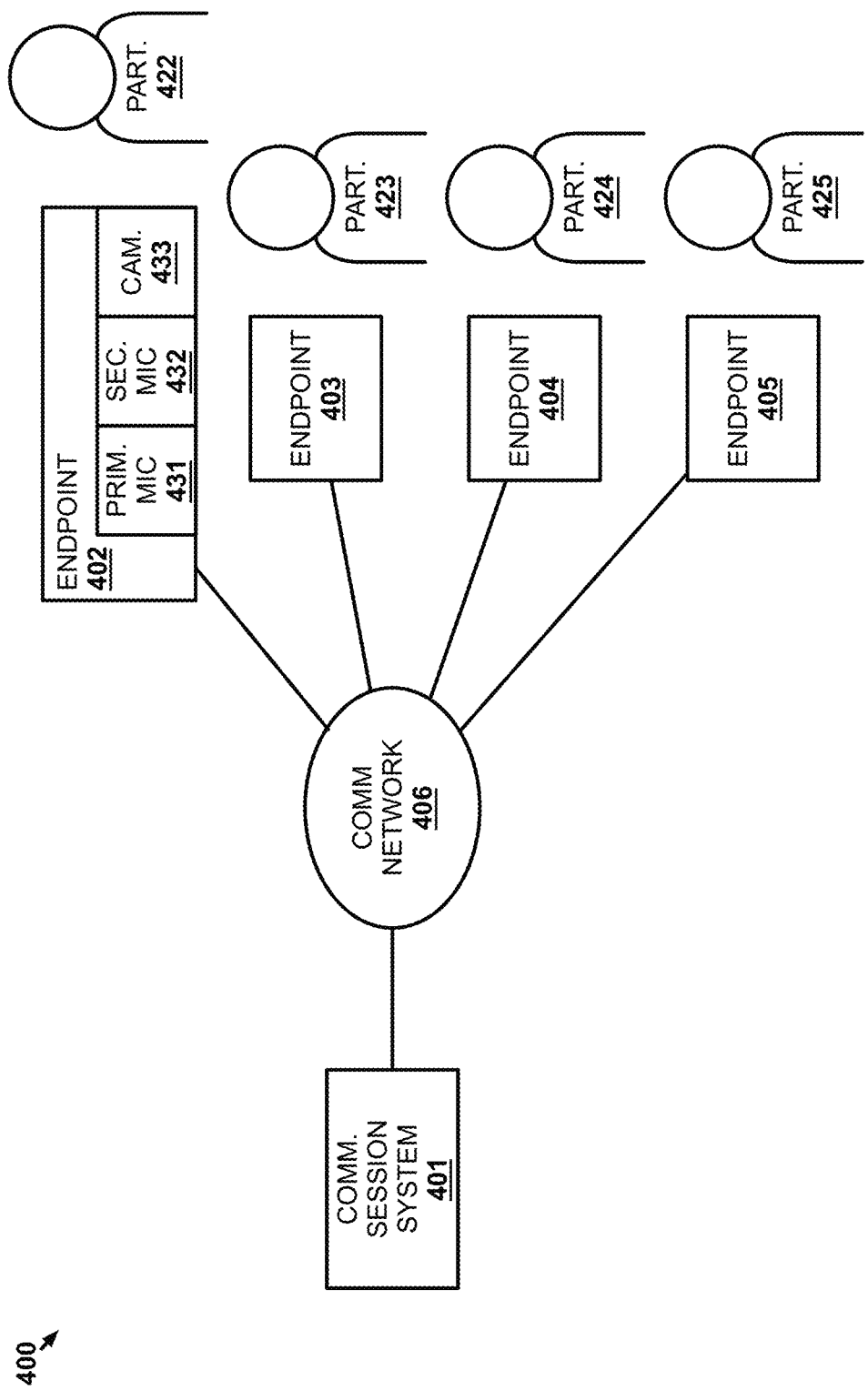
FIG. 4 illustrates an implementation for using video analysis to detect audio issues on a communication session.

FIG. 4 illustrates implementation 400 for using video analysis to detect audio issues on a communication session. Implementation 400 includes communication session system 401, endpoints 402-405, and communication network 406. Communication network 406 includes one or more local area and/or wide area computing networks, including the Internet, over which communication session system 401 and endpoints 402-405 communicate. Endpoints 402-405 may each comprise a telephone, laptop computer, desktop workstation, tablet computer, conference room system, or some other type of user operable computing device. Though only endpoint 402 is shown to have primary microphone 431, secondary microphone 432, and camera 433 for the purposes of this example, endpoints 403-405 may include similar components. Communication session system 401 may be an audio/video conferencing server, a packet telecommunications server, a web-based presentation server, or some other type of computing system that facilitates user communication sessions between endpoints. Endpoints 402-405 may each execute a client application that enables endpoints 402-405 to connect to communication sessions facilitated by communication session system 401 and provide features associated therewith, such as the detection of audio issues described below.

In operation, a real-time video communication session is established between endpoints 402-405, which are operated by respective participants 422-425. The video communication session enables participants 422-425 to speak with, and see, one another in real time via their respective endpoints 402-405. During the video communication session communication session system 401 determines whether audio of participants 422-425 from endpoints 402-405 is experiencing issues and notifies endpoints 402-405 about those issues. Using communication session system 401 to identify audio issues, as described below, allows resources of endpoints 402-405 to be used for other tasks. Likewise, communication session system 401 may be better suited to identify the audio issues. For instance, endpoint 402 may be a battery powered device, such as a smartphone, and the processing power thereon may be far less than what is available to communication session system 401.

Figure 5:
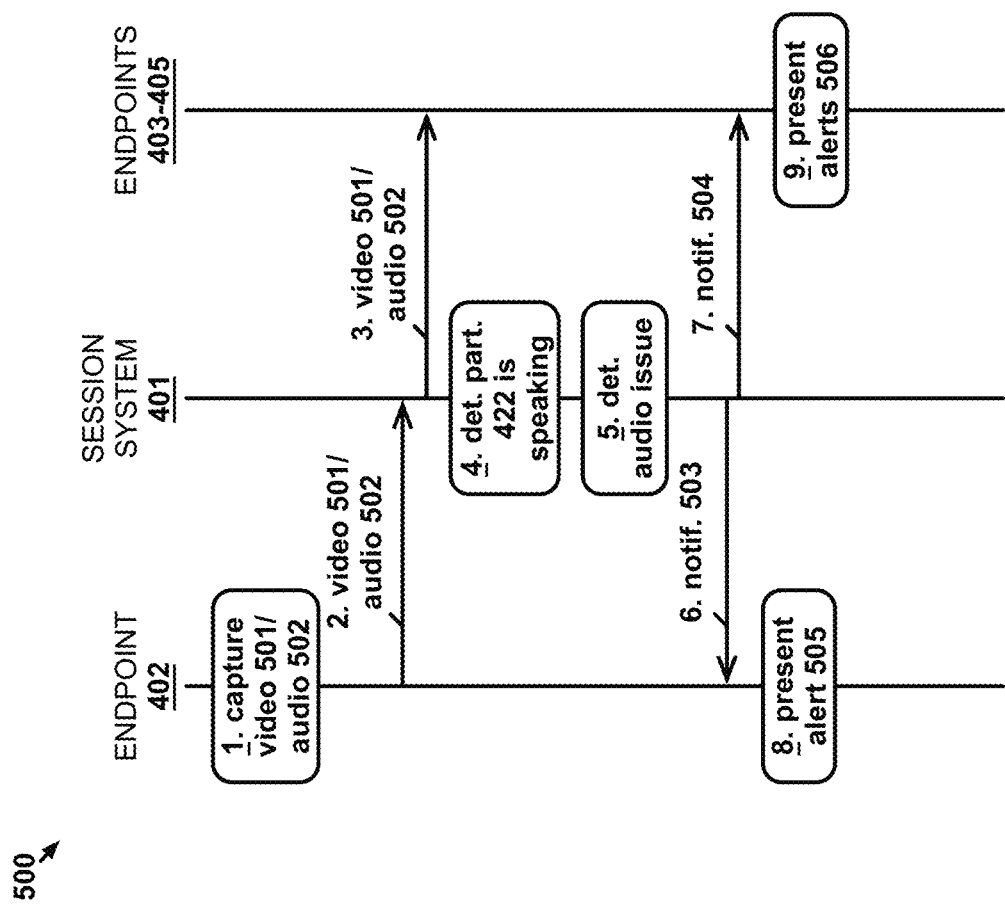
FIG. 5 illustrates an operational scenario for using video analysis to detect audio issues on a communication session.

FIG. 5 illustrates operational scenario 500 for using video analysis to detect audio issues on a communication session. Operational scenario 500 focuses on detecting an audio issue in audio from endpoint 402, although, audio issues may be detected in audio from endpoints 403-405 in a similar manner. In some examples, audio issues may be determined at both an endpoint and communication session system 401 so that a source of an audio issue can better be identified (e.g., if no issue is found at endpoint 402 but an issue is found at communication session system 401, then the issue may be caused by the connection between endpoint 402 and communication session system 401.

In operational scenario 500, endpoint 402 captures video 501 and audio 502 from participant 422 at step 1. Video 501 is captured by camera 433 and audio 502 is captured by primary microphone 431. In this example, primary microphone 431 is one of two microphones of endpoint 402 that are available for capturing audio. For example, primary microphone 431 may be a microphone in a headset worn by participant 422 and connected to endpoint 402 either wired or wirelessly while secondary microphone 432 may be a built-in microphone of endpoint 402. Primary microphone 431 is considered primary because it is currently designated for capturing audio 502. Participant 422 may designate primary microphone 431 via input into endpoint 402 (e.g., may select primary microphone 431 through a user interface of endpoint 402), primary microphone 431 may be the default microphone for communication sessions, primary microphone 431 may be selected at random, or primary microphone 431 may become primary in some other manner.

Video 501 and audio 502 are transferred to communication session system 401 at step 2 and communication session system 401 passes video 501 and audio 502 to endpoints 403-405 at step 3. In this example, audio 502 is passed to endpoints 403-405 regardless of whether communication session system 401 determines that an audio issue exists. In other examples, communication session system 401 may refrain from sending audio 502 to endpoints 403-405 upon determining that an audio issue exists. At step 4, communication session system 401 determines from video 501 that participant 422 is speaking. Communication session system 401 may use a facial recognition algorithm on video 501 and the algorithm may output that participant 422 is speaking currently or may provide time stamps when participant 422 is speaking so that the time stamps can be aligned with audio 502. In some examples, communication session system 401 may only analyze video 501 after it cannot be determined from audio 502 itself that participant 422 is speaking. That is, communication session system 401 may conserve the processing resources need to process video 501 when it is clear from processing audio 502 that participant 422 is speaking therein.

After determining from video 501 that participant 422 is speaking, communication session system 401 determines that an audio issue exists at step 5 by analyzing audio 502 to determine whether the speech in audio 502 sufficiently matches that shown in video 501. In one example, communication session system 401 may determine that no sound exists in audio 502 (or audio 502 may not be received at all in some cases) or at least no sound exists in audio 502 that is consistent with the voice of participant 422. In another example, communication session system 401 may determine that mouth movements of participant 422 in video 501 are not consistent with the sounds in audio 502. For instance, the sounds may be offset by an amount of time (e.g., delayed by half a second), may be distorted due to poor audio capture by primary microphone 431, may be distorted by a bad connection over which audio 502 is sent, or some other reason in which the sound represented in audio 502 does not match what is expected based on video 501.

Upon identifying the audio issue, communication session system 401 transmits issue notification 503 to endpoint 402 at step 6. In this example, issue notification 503 includes information about the type of audio issue that was determined by communication session system 401. The information about the type of audio issue may indicate that the issue is caused by a software setting (e.g., local mute), that speech is present but of lower than a threshold quality, that speech is fully absent from audio 502, that audio 502 was not actually received, or some other description of the identified audio issue. Endpoint 402 also sends issue notifications 504 to endpoints 403-405 at step 7. Issue notifications 504 may also include information about the type of audio issue detected by communication session system 401 or may be more generic by indicating that audio of participant 422 is experiencing an issue without specifying further details.

Upon receiving issue notification 503, endpoint 402 presents alert 505 to participant 422 at step 8. Since issue notification 503 indicated a type of audio issue, alert 505 indicates the type of audio issue in alert 505. Notifying participant 422 about the type of audio issue may help participant 422 better troubleshoot the issue. For example, if alert 505 notifies participant 422 that a local mute setting is enabled, then participant 422 will know relatively quickly that they should instruct endpoint 402 to turn off the mute setting. In another example, if alert 505 indicates a low speech volume, then participant 422 may be able to determine whether something is blocking primary microphone 431. Upon receiving issue notifications 504, endpoints 403-405 similarly present alerts 506 to their respective participants 423-425 at step 9. Issue notification 503 and issue notifications 504 may instruct endpoints 402-405 to present alert 505 and alerts 506, may instruct endpoints 402-405 on how alert 503 and alerts 504 should be presented (e.g., visually or audibly), or endpoints 402-405 may be preprogramed on how to handle received alerts. In some examples, participants 422-425 may each indicate to their respective endpoints 402-405 about how alerts should be presented. For instance, participant 422 may prefer alerts to be both visual and audible, while participant 423 may prefer alerts to be only visual. Regardless of how alert 505 and alerts 506 are presented, upon completion of operational scenario 500, participant 422 are all aware that there is an issue with audio 502 from endpoint 402 and can proceed with the communication session accordingly.

Figure 6:
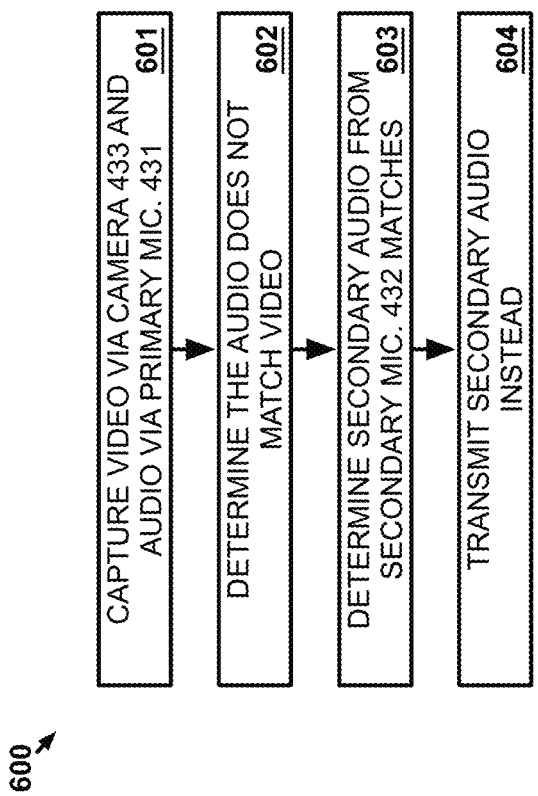
FIG. 6 illustrates an operation to represent communication session quality using words spoken on the session.

FIG. 6 illustrates operation 600 to represent communication session quality using words spoken on the session. Operation 600 is an example of how an issue with audio captured by primary microphone 431 from endpoint 402 on a communication session may automatically be remedied. Operation 600 is performed in endpoint 402 but communication session system 401 may perform operation 600 in other examples where communication session system 401 has access to audio captured by secondary microphone 432.

In operation 600, endpoint 402 captures video using camera 433 and primary audio using primary microphone 431 (601). The primary audio is captured via primary microphone 431 because endpoint 402 is currently configured (e.g., by the user, by default, or otherwise) to use audio captured by primary microphone 431 on the communication session. Endpoint 402 then determines that, while participant 422 is speaking in the video, the captured primary audio does not match the video (602). In this case, the primary audio does not include speaking while the video does. In some cases, endpoint 402 may think it is capturing the primary audio while no audio is actually being captured due to a faulty or non-existent primary microphone 431. For instance, primary microphone 431 may actually be a headset (e.g., hearing aid) that only includes speakers for hearing audio playback from endpoint 402 and endpoint 402 inadvertently assumes the headset also has a microphone. Since there is no microphone, no audio is actually captured from primary microphone 431. In other examples, endpoint 402 may determine that other types of audio issues are occurring (e.g., poor speech quality) rather than there simply being no speech at all.

Endpoint 402 then analyzes secondary audio being captured by secondary microphone 432 to determine that the secondary audio matches the video (603). Endpoint 402 may already be capturing the secondary audio so that endpoint 402 can go back and analyze the same time frame that was analyzed with respect to the primary audio. In other examples, endpoint 402 may begin capturing the secondary audio from secondary microphone 432 upon determining that the primary audio does not match the video. The secondary audio would then be compared to the corresponding video that is captured at the same time with the secondary audio. Since the secondary audio matches the video, endpoint 402 transmits the secondary audio over the communication session instead of the primary audio (604). In some examples, endpoint 402 may also notify participant 422 that the secondary audio is now being used on the communication session.

In some examples, the secondary audio may also be used to help determine the type of audio issue that is occurring. For instance, if the secondary audio is experiencing a similar audio issue as the primary audio (e.g., low quality), then the audio issue is likely not of a type that is caused by a microphone hardware issue. Endpoint 402 may then narrow down the list of possible issue types by removing the microphone hardware issue from the potential possibilities.

Figure 7:
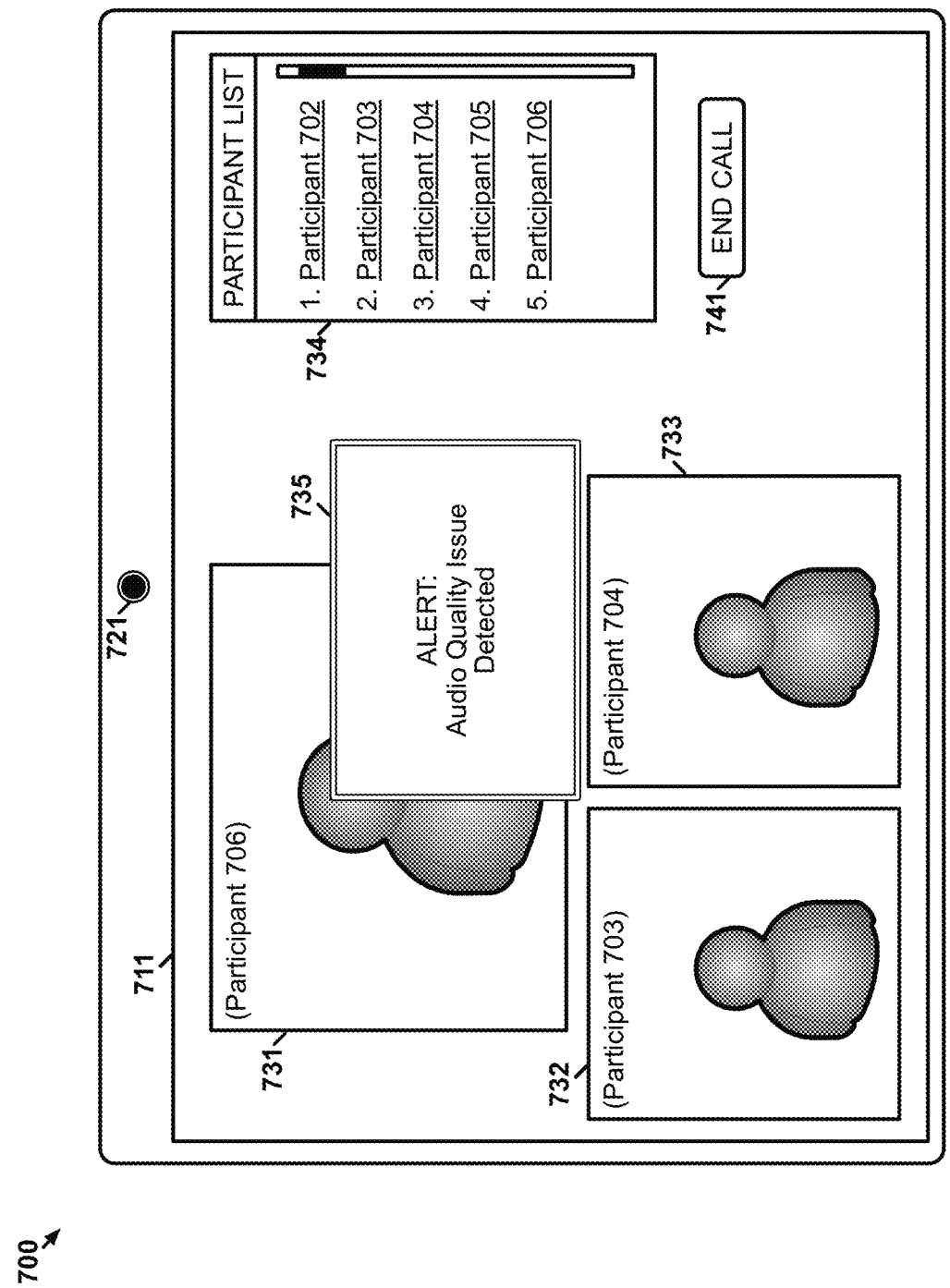
FIG. 7 illustrates a display system for using video analysis to detect audio issues on a communication session.

FIG. 7 illustrates display system 700 for using video analysis to detect audio issues on a communication session. Display system 700 includes display 711 and camera 721. Display 711 may be a cathode ray tube (CRT), Liquid Crystal Display (LCD), Light Emitting Diode display (LED), or some other type of display capable of presenting images described below. Camera 721 includes optics and an image sensor for capturing video of a participant viewing display 711. Though not shown, display system 700 may be a display system for an endpoint described elsewhere herein.

Display 711 is displaying an example Graphical User Interface (GUI) for a client application connected to a video communication session between participants 702-706, as shown in participant list 734. Participant 702 is operating the endpoint of display system 700. The GUI also shows participant windows 731-733 and end call button 741, which removes the participant at display system 700 from the communication session when pressed. Real-time video of participant 706 is shown in participant window 731, which is larger than participant window 732 and participant window 733 because participant 706 was recently speaking. Participant window 732 shows real-time video of participant 703 and participant window 733 shows real-time video of participant 704. Video of the remaining participants on the communication session may not displayed because those participants are not one of the three most recent speakers, those participants do not have video enabled, or for some other reason.

In this example, participant 702 is now speaking on the communication session. Video and audio of participant 702 should, therefore, be displayed at the endpoints of participants 703-706. Audio captured by the endpoint of participant 702 is determined to have an issue in accordance with the examples described above. As such, the client application directs the endpoint to display audio issue alert 735 on display 711. The endpoint may also play an audible and/or provide a tactile alert to ensure participant 702 is aware of audio issue alert 735. In this example, audio issue alert 735 notifies participant 702 that the audio issue is an audio quality issue. In other examples, audio issue alert 735 may provide additional details about the audio quality issue, such as low speech volume or dropped words. Participant 702 can then attempt to remedy the quality issue before continuing to speak since the other participants may have trouble comprehending participant 702 due to the quality issue.

Figure 8:
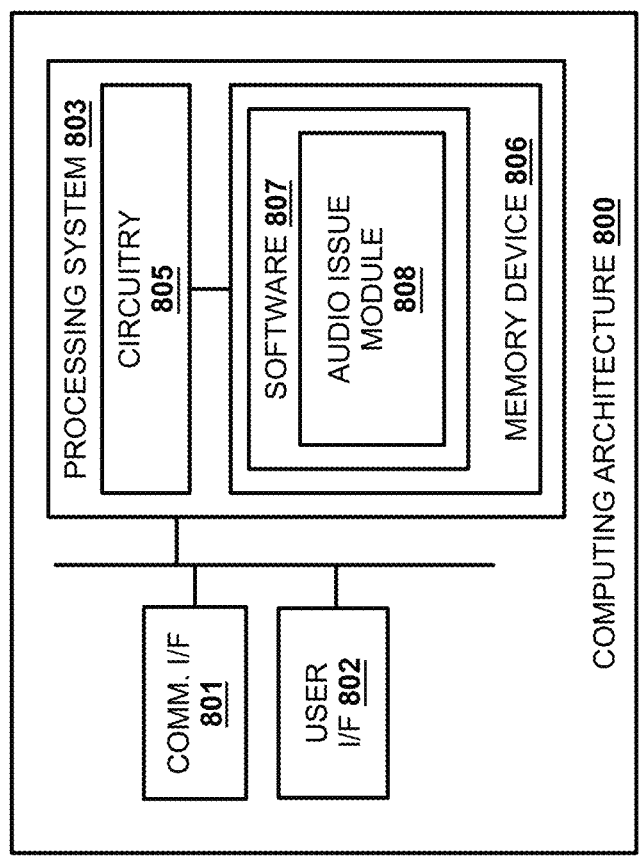
FIG. 8 illustrates a computing architecture for using video analysis to detect audio issues on a communication session.

FIG. 8 illustrates computing architecture 800 for using video analysis to detect audio issues on a communication session. Computing architecture 800 is an example computing architecture for endpoints 102, 402 and communication session systems 101, 401, although systems 102, 402, 101, and 401 may use alternative configurations. Computing architecture 800 may also be used for other computing systems described herein. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes audio issue module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, audio issue module 808 directs processing system 803 to receive video of a first participant communicating over a communication session between a first endpoint of the participant and a second endpoint of a second participant. Audio issue module 808 also directs processing system 803 to determine from the video that the participant is speaking. In response to determining that the participant is speaking, audio issue module 808 directs processing system 803 to determine an audio issue exists due to audio of the first participant not corresponding to the video and notify the first participant about the audio issue.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
    receiving video of a first participant communicating over a communication session between a first endpoint of the first participant and a second endpoint of a second participant;
    determining from the video that the first participant is speaking;
    in response to determining that the first participant is speaking, capturing audio of the first participant by a microphone peripheral of the first endpoint, the audio including one or more sounds;
    determining an audio issue exists due to at least one of the one or more sounds which are present in the audio captured of the first participant not being consistent with a voice of the first participant, wherein consistency with the voice of the first participant is determined based at least in part on a portion of the video which corresponds in time to the at least one sound, wherein the audio issue comprises an audio issue type of a plurality of different audio issue types and wherein the microphone peripheral is designated by the first participant to capture the audio for transmission over the communication session;
    presenting a first notification describing the audio issue to the first participant, wherein presenting the first notification comprises displaying a visual alert indicating the audio issue on a display of the first endpoint;
    presenting a second notification describing the audio issue to the second participant after determining the audio issue, determining a secondary microphone built into the first endpoint is capturing secondary audio of the first participant; and
    in response to determining that the secondary microphone is capturing the secondary audio, transmitting the secondary audio over the communication session instead of the audio.

2. The method of claim 1, wherein presenting the second notification comprises at least one of:
    displaying a second visual alert indicating the audio issue on a second display of the second endpoint; and
    playing a second audible alert indicating the audio issue through a second speaker of the second endpoint.

3. The method of claim 1, wherein determining the audio issue exists comprises:
    determining that a setting of the communication session with respect to the audio is causing the audio and the video to not correspond.

4. The method of claim 1, wherein determining the audio issue exists comprises:
    determining that a hardware issue is causing the audio issue.

5. The method of claim 1, wherein determining the audio issue exists comprises:
    determining that the audio is not synchronized in time with the video.

6. The method of claim 1, wherein determining the audio issue exists comprises:
    determining that the audio is below a threshold audio quality or is not being received.

7. The method of claim 1, wherein determining the audio issue exists comprises:
    determining a low speech volume due to a blocking of the microphone peripheral.

8. The method of claim 1, wherein the second notification indicates the audio issue type.

9. The method of claim 1, wherein receiving the video comprises:
    capturing the video from a camera of the first endpoint.

10. The method of claim 1, wherein receiving the video comprises:
    receiving the video over a network connection with the first endpoint.

11. An apparatus comprising:
    one or more computer readable storage media;
    a processing system operatively coupled with the one or more computer readable storage media; and
    program instructions stored on the one or more computer readable storage media that, when read and executed by the processing system, direct the processing system to:
        receive video of a first participant communicating over a communication session between a first endpoint of the first participant and a second endpoint of a second participant;
        determine from the video that the first participant is speaking;
        in response to determining that the first participant is speaking, determine an audio issue exists due to audio captured of the first participant by a microphone peripheral of the first endpoint not corresponding to the video
        in response to determining that the first participant is speaking, capture audio of the first participant by a microphone peripheral of the first endpoint, the audio including one or more sounds;
        determine an audio issue exists due to at least one of the one or more sounds which are present in the audio captured of the first participant not being consistent with a voice of the first participant, wherein consistency with the voice of the first participant is determined based at least in part on a portion of the video which corresponds in time to the at least one sound, wherein the audio issue comprises an audio issue type of a plurality of different audio issue types and wherein the microphone peripheral is designated by the first participant to capture the audio for transmission over the communication session;
        present a first notification describing the audio issue to the first participant, wherein presenting the first notification comprises displaying a visual alert indicating the audio issue on a display of the first endpoint;
        present a second notification describing the audio issue to the second participant;

after determining the audio issue, determine a secondary microphone built into the first endpoint is capturing secondary audio of the first participant; and in response to determining that the secondary microphone is capturing the secondary audio, transmit the secondary audio over the communication session instead of the audio.

12. The apparatus of claim 11, wherein to notify the second participant, the program instructions direct the processing system to at least one of:

display a second visual alert indicating the audio issue on a second display of the second endpoint; and playing a second audible alert indicating the audio issue through a second speaker of the second endpoint.

13. The apparatus of claim 11, wherein to determine the audio issue exists, the program instructions direct the processing system to:

determine that a setting of the communication session with respect to the audio is causing the audio and the video to not correspond.

14. The apparatus of claim 11, wherein to determine the audio issue exists, the program instructions direct the processing system to:

determine that a hardware issue is causing the audio issue.

15. The apparatus of claim 11, wherein to determine the audio issue exists, the program instructions direct the processing system to:

determine that the audio is not synchronized in time with the video.

16. The apparatus of claim 11, wherein to determine the audio issue exists, the program instructions direct the processing system to:

determine that the audio is below a threshold audio quality or is not being received.

17. The apparatus of claim 11, wherein to determine the audio issue exists, the program instructions direct the processing system to:

determine a low speech volume due to a blocking of the microphone peripheral.

18. The apparatus of claim 11, wherein the second notification indicates the audio issue type.

19. The apparatus of claim 11, wherein to receive the video, the program instructions direct the processing system to:

capture the video from a camera of the first endpoint.

20. One or more computer readable storage media having program instructions stored thereon that, when read and executed by a processing system, direct the processing system to:

receive video of a first participant communicating over a communication session between a first endpoint of the first participant and a second endpoint of a second participant;

determine from the video that the first participant is speaking;

in response to determining that the first participant is speaking, capture audio of the first participant by a microphone peripheral of the first endpoint, the audio including one or more sounds;

determine an audio issue exists due to at least one of the one or more sounds which are present in the audio captured of the first participant not being consistent with a voice of the first participant, wherein consistency with the voice of the first participant is determined based at least in part on a portion of the video which corresponds in time to the at least one sound, wherein the audio issue comprises an audio issue type of a plurality of different audio issue types and wherein the microphone peripheral is designated by the first participant to capture the audio for transmission over the communication session;

present a first notification describing the audio issue to the first participant, wherein presenting the first notification comprises displaying a visual alert indicating the audio issue on a display of the first endpoint;

present a second notification describing the audio issue to the second participant;

after determining the audio issue, determine a secondary microphone built into the first endpoint is capturing secondary audio of the first participant; and in response to determining that the secondary microphone is capturing the secondary audio, transmit the secondary audio over the communication session instead of the audio.

* * * * *